United States Patent [19]
Oostenbrink

[11] 3,831,985
[45] Aug. 27, 1974

[54] PIPE CONNECTION
[75] Inventor: Albertus Anthony Oostenbrink, Hardenberg, Netherlands
[73] Assignee: Industriele Onderneming Wavin N.V., Zwolle, Netherlands
[22] Filed: Jan. 4, 1972
[21] Appl. No.: 215,293

[30] Foreign Application Priority Data
Jan. 8, 1971   Netherlands.................. 7100263

[52] U.S. Cl............................. 285/162, 285/208
[51] Int. Cl............................................. F16l 41/00
[58] Field of Search.......... 285/196, 220, 162, 208, 285/158; 16/2

[56] References Cited
UNITED STATES PATENTS
2,132,636   10/1938   Maahs................................ 285/208
3,272,542   9/1966   Haulik et al. ........................ 285/189

FOREIGN PATENTS OR APPLICATIONS
742,077   3/1944   Germany............................. 285/208

Primary Examiner—Andrew V. Kundrat
Attorney, Agent, or Firm—Woodhams, Blanchard and Flynn

[57]  ABSTRACT

Pipe connection comprising a pipe and a branch pipe being connected by means of a sleeve having an inner helical profile corresponding to the profile of the branch pipe and a groove for receiving the edge of an opening in the pipe.

4 Claims, 2 Drawing Figures

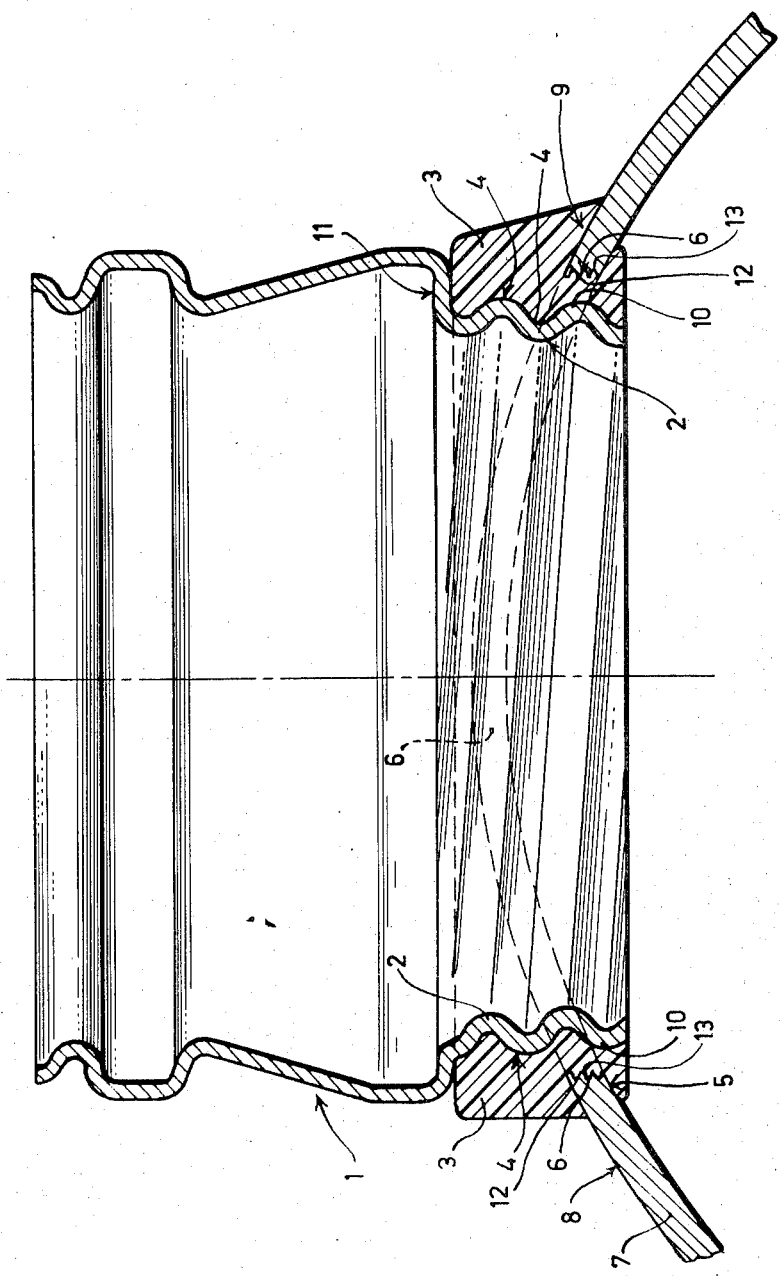

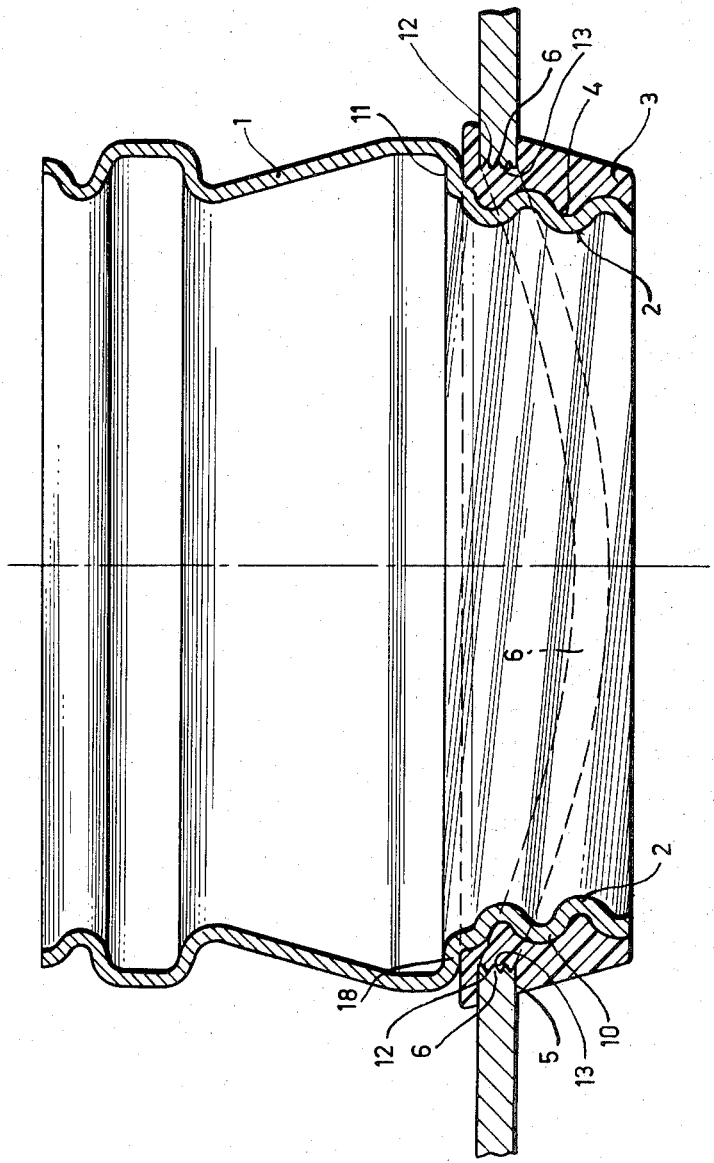

3,831,985

PIPE CONNECTION

BACKGROUND OF THE INVENTION:

The invention relates to a pipe connection comprising an elastic seal which on one hand cooperates with a first pipe part and on the other hand with a second pipe part.

Connections of this type are commonly known.

It is known for instance to interconnect two pipe parts, while a seal is accommodated in a groove situated on the inner side of a pipe part, the seal cooperating with another pipe part which is slid into the former. Such a connection has the drawback that in certain cases the seal is pushed from the groove when the other pipe part is introduced. In order to overcome this trouble, it has already been proposed to retain the seal by special clamping means, but this solution is not quite satisfactory. This connection is not suitable for branch connections.

On the other hand it is known that branch connections between two pipes or between a pipe and a container, via an opening in the wall of a container, often give rise to difficulties.

For example one is compelled to use individual auxiliary pieces for the purpose of establishing branch connections between two pipes which on the one hand are connected with a first pipe part and on the other hand with a second pipe part whilst providing sealing means in the auxiliary equipment. The provision of such fittings is time consuming and has furthermore the effect of increasing the cost.

SUMMARY OF THE INVENTION:

It is now an object of the invention to obviate these difficulties by applying an elastic seal shaped in such a way that the aforementioned drawbacks are eliminated.

The invention relates therefore to a pipe connection, comprising an elastic seal which on the one hand cooperates with a first pipe part and on the other hand with a wall part surrounding an opening in the arcuate wall of a second pipe part wherein the elastic seal is provided with a recess cooperating with the wall part surrounding the opening and with a helically extending profile, while the first pipe part has a substantially identical screw thread profile co-operating with the aforementioned profile.

Due to the provision of a helical profile on the elastic seal, a proper tensile stress resistant connection can be ensured between the seal and a pipe part carrying an analogous screw thread profile.

It is possible to establish in this way a pipe connection whereby a first pipe part carries on the inner side a screw thread profile corresponding with the profile of the seal and cooperating therewith, while the other side of the seal is smooth or carries e.g., a flap which ensures an adequate seal when another pipe part is introduced. Due to the co-operation of the screw thread-shaped profiles the seal is excellently retained and the same cannot be pushed away when another pipe part is moved in the first pipe part.

The elastic seal has advantageously a flange or groove on the outer side which cooperates with a second pipe part and which is situated in the helical profile on the inner side of the seal, co-operating with a first pipe part which likewise on its surface, co-operating with the inner side of the seal, is provided with a screw thread profile.

Such a connection is particularly suitable for establishing a branch connection between e.g., a main sewer pipe and a drain. The great advantage is that the circumferential edge of an opening in a main sewer pipe can be caused to snap into the groove, while on the other hand the helically extending profile allows a screw-type connection with a socket, which at the end is likewise provided with a screw thread profile, into the seal. thread The screw thread profile of the first pipe part is formed on a surface shaped as a frustrum of a cone, the smallest diameter of which is situated in the proximity of the free end which has a screw thread profile. When applying a seal in which the wave valleys are situated on a cylindrical surface, if the seal is mounted on the second pipe part, the material of the elastic seal sleeve is pushed outwardly when the first pipe part is screwed into the sealing due to the tapered shape of the screw-thread portion, whereby the elastic material is pressed against the circumferential edge of the opening in the second pipe part and an excellent seal is obtained between this edge and the seal on the one hand, and the seal sleeve and the part to be screwed in, or the first pipe part on the other hand. In addition thereto the co-operation of the groove with the circumferential edge of the opening will ensure a firm securing between the two pipe parts.

BRIEF DESCRIPTION OF THE DRAWINGS:

FIG. 1 shows a cross-section of a branch pipe connection according to the invention between two pipe parts; and FIG. 2 shows a longitudinal section through the branch connection between two pipe parts as shown in FIG. 1.

DESCRIPTION OF PREFERRED EMBODIMENTS:

FIGS. 1 and 2 show a branch connection comprising a first pipe part 1 in the shape of a socket serving as a branch pipe for a second pipe part in the shape of a main sewer pipe 7, the second pipe 7 as shown in the drawings being of substantially larger diameter than the first pipe 1.

The first pipe part or socket 1 is at its end provided with a screw thread profile 2. This screw thread profile co-operates with an almost corresponding screw thread profile 4 in a rubber sealing ring 3. The sealing ring 3 is provided with an annular groove 5 into which extends the circumferential edge 6 which defines the opening in the main sewer pipe 7. Instead of groove 5 it suffices in particular cases, to apply a single flange 9 on the rubber sealing ring, which then cooperates with the outer side 8 of the main sewer pipe 7 and, on the other hand with the circumferential edge 6 when this sealing ring is clampingly pressed against the edge 6.

The sealing sleeve 3 can be easily forced against the edge 6 by the arrangement that in the sealing sleeve 3 the wave valleys of the screw profile are provided on a cylindrical surface and on the other hand the wave tops 10 of the screw profile on the outer side of the socket 1 are provided on a surface shaped as the frustrum of a cone. This means that the outer side of the socket 1 at its end with the screw thread profile, tapers inwardly toward its free end. On screwing in the socket 1 the wave tops provided at the end of the socket 1 will press the rubber material of the sealing ring 3 outwards and against the circumferential edge 6. As a result a clamping effect is obtained. When no groove is available it is possible, due to a suitable selection of the profile, to press the rubber material vigorously against the circumferential edge, whereby the socket 1 and pipe 7 are prevented from coming apart. It is, however, advisable to use a groove since the same contributes to a proper connection. The socket 1 is provided with a shoulder 11 which ensures that the socket is screwed for the desired length into the sealing 3. Furthermore the shoulder contributes to a proper fixation of the socket 1.

If desired, the circumferential edge can have a particular profile to ensure a proper cooperation with the rubber material.

For connecting the socket 1 to other pipe parts all known pipe connection constructions can be used which, however, will not be discussed here any further.

The sealing ring 3 consists preferably of rubber material with a Shore hardness of 70, while the pipes 7 and 1 consist preferably of thermoplastic material like polyvinylchloride or polyethylene or of fiber reinforced thermosetting materials such as polyester or epoxy resins whether or not containing filler particles.

It will be obvious that the groove 5 on the surface of the flange 9 is adapted to the surface of the wall of the main sewer pipe 7, which cooperates with the groove 5.

The bottom 13 of the groove 5 is provided with one or two circumferential ribs 12 which facilitate the screwing in of socket 1 and prevent any leakage which might be due to a less careful cutting out of the opening in the pipe part 7.

It will be obvious that due to the presence of a single, double or quadruple screw thread the sealing sleeve can be easily screwed in. When another pipe part is inserted the sealing sleeve will be excellently retained and even at rather high pressures it will not easily be dislodged from the grooves, the more so since the walls of the groove can be caused to taper toward the open upper side whereby an excellent clamping effect is exerted on the sealing.

The pitch of the profile on sealing and pipe part are substantially identical but differences are allowed.

What I claim is:

1. A pipe connection, comprising an elastic ringlike sealing member connected between first and second pipe parts, the second pipe part having a substantially circular opening formed in the arcuate wall thereof and defined by a substantially annular edge, said sealing member having an annular recess formed on the external surface thereof, said recess being defined by at least a bottom wall and a side wall, said annular edge being positioned in said recess and disposed in snug sealing engagement with said sealing member, the bottom wall of said recess being provided with at least one circumferential rib disposed in engagement with the circumferential face of said annular edge, said sealing member having an inner annular surface formed with a screw thread thereon, and said first pipe part having a portion formed with an external screw thread thereon which is similar to the screw thread formed on the internal surface of said sealing member, whereby said portion of said first pipe part is threadably and sealingly connected to said sealing member.

2. A pipe connection according to claim 1, wherein said recess comprises a channel-like groove of substantially uniform width as defined between opposed and substantially parallel side walls.

3. In combination, a first pipe of rather large diameter having a substantially circular opening formed in the arcuate sidewall thereof, said opening being defined by a substantially annular edge portion of said sidewall, a second pipe of relatively small diameter in comparison to said first pipe and extending substantially transverse to said first pipe, said second pipe having an exteriorly threaded end portion projecting into the opening formed in said first pipe, and connecting means for sealingly connecting the end portion of said second pipe to the annular edge portion surrounding the opening formed in said first pipe, the improvement wherein said connecting means comprises a one-piece ringlike sealing member constructed of an elastomeric material, said ringlike sealing member having a bore extending therethrough defined by an internal surface having a screw thread formed thereon which is compatible with the screw thread formed on the end portion of said second pipe, the screw thread formed on the end portion of said second pipe and the screw thread formed on the internal surface of said sealing member being slightly tapered relative to one another for causing said sealing member to be elastically deformed outwardly into tight sealing engagement with said first pipe when said end portion of said second pipe is threadably engaged within said bore, and said sealing member having an annular groove formed therein and externally surrounding same, said annular groove being of a substantially channel-shaped cross section and being defined by a bottom wall and a pair of spaced and substantially parallel side walls, said groove having a substantially uniform width throughout the circumferential length and depth thereof, the annular edge portion of said first pipe being disposed within said annular groove and positioned in sealing engagement with said sealing member, the bottom wall of said groove being provided with at least one circumferential rib projecting outwardly therefrom and disposed for sealing engagement with the circumferential face of said annular edge portion, and the side wall on said sealing member being compressed into snug sealing engagement with the external surface of said first pipe due to the elastic deformation of said sealing member when said end portion of said second pipe is threaded into said bore.

4. In combination, a first pipe of rather large diameter having a substantially circular opening formed in the arcuate side wall thereof, said opening being defined by a substantially annular edge portion of said sidewall, a second pipe of relatively small diameter in comparison to said first pipe and extending substantially transverse to said first pipe, said second pipe having an exteriorly threaded end portion projecting into the opening formed in said first pipe, and connecting means for sealingly connecting the end portion of said second pipe to the annular edge portion surrounding the opening formed in said first pipe, the improvement wherein said connecting means comprises a one-piece ringlike sealing member constructed of an elastomeric material, said ringlike sealing member having a substantially uniform bore extending therethrough defined by an internal surface having a screw thread formed thereon which is compatible with the screw thread formed on the end portion of said second pipe, the exterior screw thread formed on the end portion of said second pipe tapering inwardly toward the free end thereof for causing the part of the sealing member positioned externally of said first pipe to be elastically deformed outwardly into tight sealing engagement with the external surface of said first pipe in surrounding relationship to said opening when said end portion of said second pipe is threadably engaged within said bore, said second pipe having a shoulder disposed adjacent the inner end of said end portion, said shoulder being positioned in clamping engagement with the external part of said sealing member for additionally causing same to be elastically deformed and tightly sealingly clamped against the external surface of said first pipe in surrounding relationship to said opening, said sealing member having an annular groove formed therein and externally surrounding same, said annular groove being of a substantially channel-shaped cross section and being defined by a bottom wall and a pair of spaced and substantially parallel side walls, said groove having a substantially uniform width throughout the circumferential length and depth thereof, and the annular edge portion of said first pipe being disposed within said annular groove and positioned in sealing engagement with said sealing member, the side wall on said sealing member being compressed into snug sealing engagement with the external surface of said first pipe due to the elastic deformation of said sealing member when said end portion of said second pipe is threaded into said bore.

* * * * *